United States Patent [19]

Chang

[11] Patent Number: 4,839,837
[45] Date of Patent: Jun. 13, 1989

[54] THREE LAYERED LAPTOP COMPUTER

[76] Inventor: Bo E. Chang, 22 Yearling Ct., Rockville, Md. 20850

[21] Appl. No.: 112,999

[22] Filed: Oct. 27, 1987

Related U.S. Application Data

[63] Continuation-in-part of Ser. No. 870,854, Jun. 4, 1986, abandoned.

[51] Int. Cl.⁴ ................................................ G06F 1/00
[52] U.S. Cl. ................................. 364/708; 364/709.01
[58] Field of Search ............. D14/100, 102, 104, 106, D14/105; D18/2; 364/708, 709

[56] References Cited

U.S. PATENT DOCUMENTS

D. 280,511 10/1985 Moggridge ........................ D14/106
D. 290,845 6/1987 Yubisui ............................. D14/111

Primary Examiner—Eugene R. La Roche
Assistant Examiner—David Soltz
Attorney, Agent, or Firm—Richard C. Litman

[57] ABSTRACT

A portable, three layered laptop computer assembly includes a keyboard member pivotably attached to an output member and provided with an intermediate display member. Upon opening the three members from a closed position with the members forming a regular cubic configuration, the keyboard and output members will be disposed with their bottom surfaces co-planar while the display member attached to the mount member is automatically positioned in a substantially vertical manner.

12 Claims, 2 Drawing Sheets

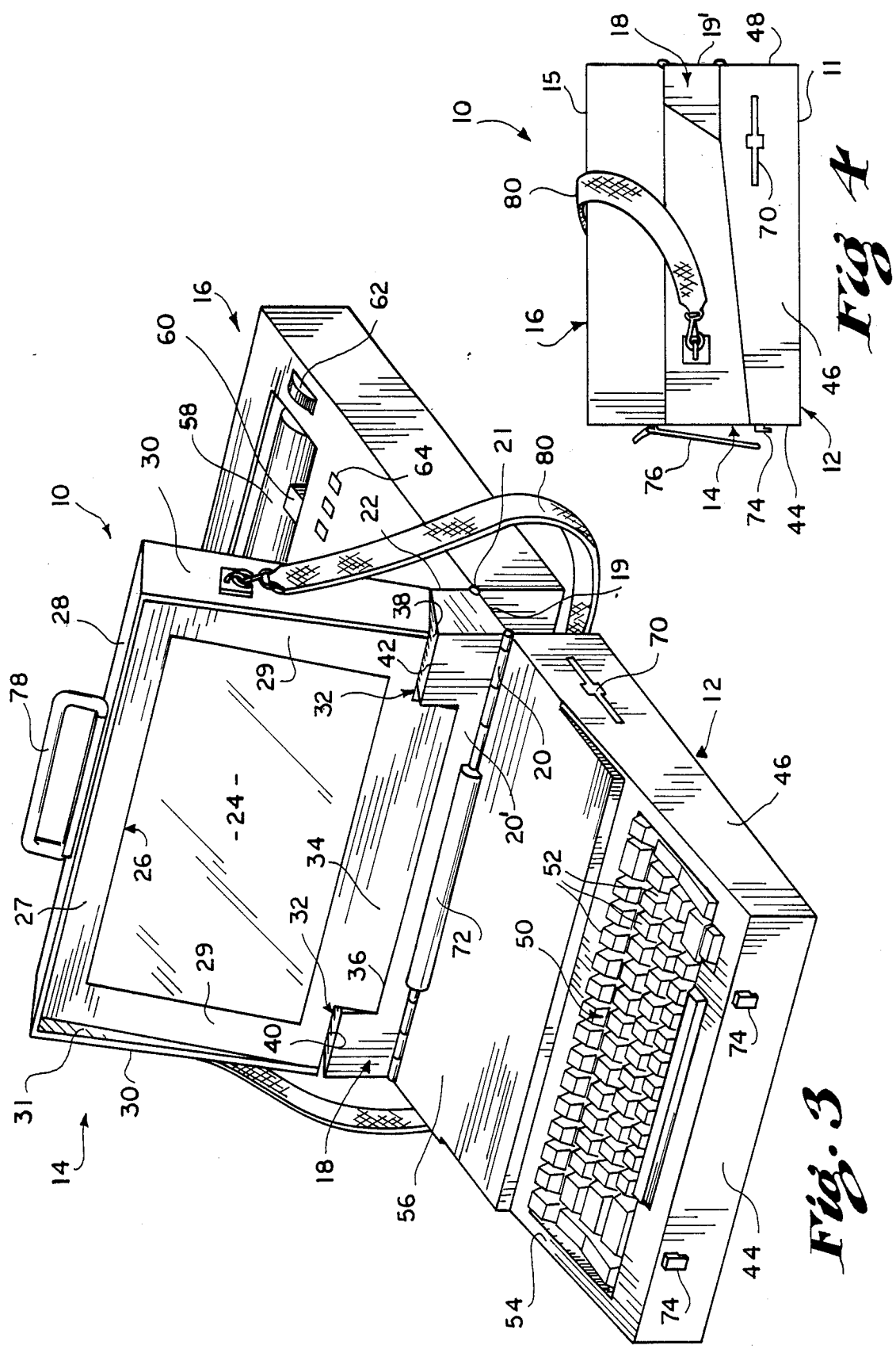

THREE LAYERED LAPTOP COMPUTER

CROSS-REFERENCE TO RELATED APPLICATION

This application is a continuation-in-part of my co-pending application Ser. No. 870,854 filed June 4, 1986 and entitled Three Layer Portable Computer.

FIELD OF THE INVENTION

This invention relates to laptop portable computers and, more particularly, to a computer system that combines all of the essential components such as a keyboard, CPU, display and output, along with necessary connections, into a unitary three layered laptop computer. Most usually, the output component will comprise a printer.

BACKGROUND TO THE INVENTION

The present invention makes a distinction between laptop computers having only a keyboard and screen member and a fully functioning system having means for output of data into a hard copy format. Separate, small, lightweight printers have been developed for use with laptop computers but require provision of their own supporting surface and attachment of at least a data cable to the CPU.

Further, this invention relates to devices for compactly folding the respective joined component members of the device into a unit that protects fragile elements, such as the terminal display and provides the user with a substantially cubic configuration of the closed device to aid in ease of transport and storage.

This apparatus further relates to laptop computers that, as the keyboard, display and output components are unfolded when the device is m ade ready for use, the apparatus presents itself in a coplanar arrangement that is very convenient for the user. The display screen will be disposed substantially vertically and will be adjustable for the best line sight or inclination relative the user. The keyboard will be disposed horizontally on the lap in front of the screen, while the output unit, such as a printer will be coplanar with the keyboard and disposed behind the vertical display component.

SUMMARY OF THE PRIOR ART

The following cited references are exemplary of the U.S. prior art. They are:

| U.S. Pat. No. | Inventor |
| --- | --- |
| 3,047,350 | Eckstein et al |
| 4,294,496 | Murez |
| D-250,588 | Mayer et al |
| D-280,511 | Moggridge et al |

U.S. Pat. No. 3,047,350, issued to Eckstein et al, discloses an audiometer case which is portable and may quickly be opened to an appropriate position, for convenient use on a bench or similar surface.

U.S. Pat. No. 4,294,496, to Murez, teaches the construction of a portable computer enclosure which has hinged members, thereby enabling the computer to be easily transported.

None of the above references, taken singularly or in combination, disclose the specific features of the present invention in any way as to bear upon the claims as appended hereto.

SUMMARY OF THE INVENTION

A primary object of the invention is to provide an improved laptop computer utilizing a cooperative relationship between a joined keyboard, display, and output member to enable a user to fully utilize the device as a computer system.

Another object of the invention is to provide means for compactly and conveniently folding a three layered portable computer unit so as to insure the safety of fragile components, such the the display member, and further to provide a device that is easily transported and stored.

Still another object of the present invention is to provide an improved assembly of three interconnected computer components which when opened provide a display member presenting a more convenient line of sight inclination to the user with a glare shield around the screen of the display member and whereby the glare shield provides impact protection to the fragile screen member as the assembly is closed and made ready for transportation.

Another object is to provide a coplanar relationship between a keyboard member and a connected output member so as to allow the opened assembly to repose flat on any suitable supporting surface with the supported keyboard and output member in turn providing a suitable mounting for an intermediate display screen member.

A further object provides for utilizing peripheral devices both off-line, as in the incorporation of read-/write drive elements and on-line devices, such as communication means, to provide a fully functioning system capacity in a laptop computer.

DESCRIPTION OF THE DRAWING

FIG. 3 is a top perspective view of the apparatus of FIG. 2; and

FIG. 4 is a side elevation of the apparatus as it appears when folded with the display member sandwiched between the keyboard and output member.

DESCRIPTION OF THE PREFERRED EMBODIMENT

Figure 1:
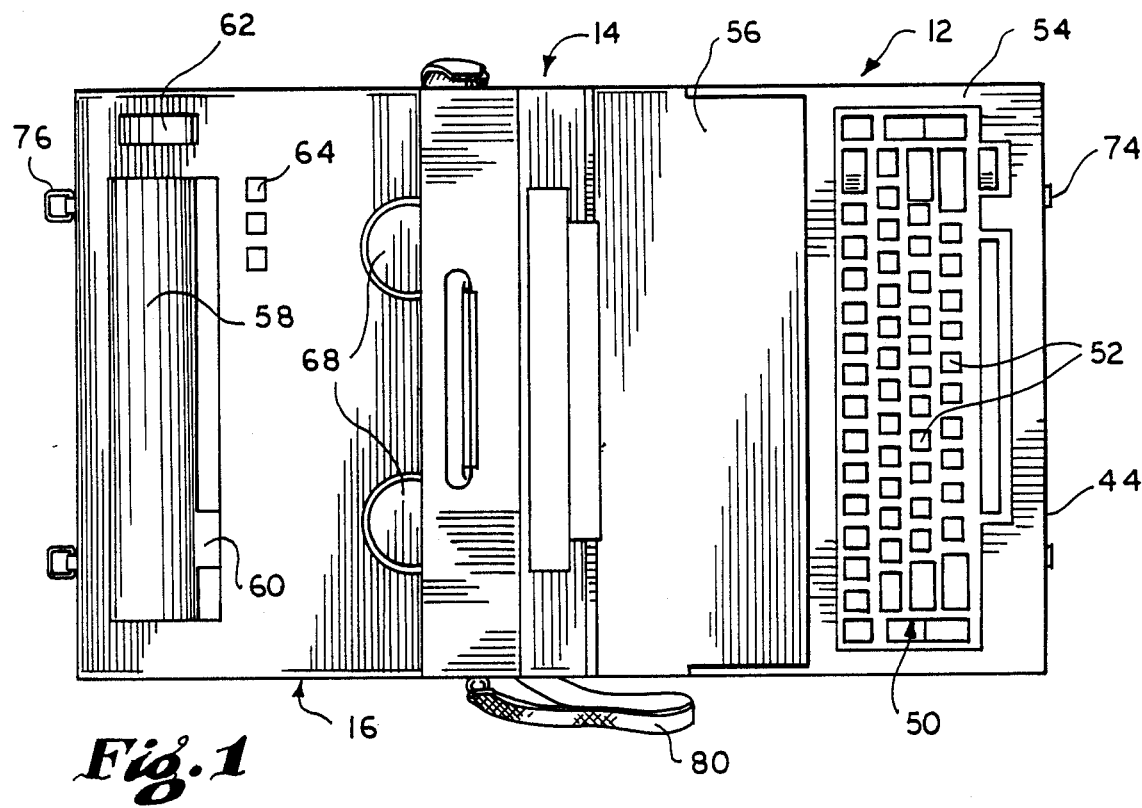
FIG. 1 is a top plan view of an opened device according to the invention, illustrating the major components comprising a keyboard member, output member and a vertically disposed display member.

Referring now to the drawings, in which like numerals refer to like elements throughout, the laptop or portable computer assembly 10 includes a keyboard layer or member 12, a display layer or member 14 and an output layer or member 16, preferably a printer. An intermediate mount element 18 spans the full common width of the three aforementioned members or components and is respectively pivotally attached to the keyboard 12 and output component 16 by hinges 20,21. These hinges will be seen to be carried by the mount 18 at the juncture of its bottom wall 19 and the parallel front and rear walls 20',22. In this manner, when the assembly 10 is opened as in FIG. 2, the flat bottom 11 of the keyboard unit 12 and flat bottom 15 of the output unit 16 will be substantially co-planar and maintain the mount front and rear walls 20',22 in vertical planes. Alternatively, the mount element 18 may be omitted with the hinges 20,21 directly joining the three layers 12,14 and 16 together.

The display component 14, like the other two principal components, is a unitary member and includes a flat screen unit 24 surrounded by a border 26, three sides of which are in turn bounded by a top frame 28 and two side frames 30—30. The end portions of the bottom of the display component border is notched as at 32—32 to provide therebetween an intermediate, depending tongue 34 adapted to closely fit within a central cut-out 36 formed in the mount element 18. Suitable pivot means (not shown) maintains the display unit affixed to the mount element and allows limited angular adjustment of the plane of the screen 24, according to the user's needs. Such adjustment is permitted in view of the slight clearance 38 provided between the bottom edge 40 of the border sides 29 and the top wall 42 of the mount element 18, both of which surfaces will be seen to be inclined downwardly toward the rear of the assembly.

The top of the monitor border 26 is recessed within the adjacent top frame 28 while the border sides 29—29 are also recessed with respect to the side frames 30—30 such that a recess 31 is provided and within which the plane of the screen 24 will be seen to be angularly disposed. With this arrangement, the frame serves as a shield to provide protection against a certain amount of glare affecting the image presented upon the screen.

The keyboard component 12 comprises a fixed unit having planar peripheral walls including a front wall 44 joined to two side walls 46 in turn connected to a rear wall 48 and wherein the front wall will be seen from FIG. 4 to be shorter than the rear wall 48. The opened top of this unit includes the key area 50 containing the usual necessary keys 52 disposed substantially in the plane of the downwardly inclined front top surface 54. As will be seen most clearly in FIGS. 2 and 3, a rear top surface 56 behind the front top surface 54 is disposed in a horizontal plane, co-planar with the keyboard component bottom wall 11. The significance of the configuration of the various elements of the keyboard and display components will become apparent hereinafter as the use of the assembly is described.

The remaining, third, output component 16 preferably comprises a printer, either a thermal or ribbon impact type having the necessary platen 58 and printhead 60. The platen may be manually manipulated to insert or remove paper, as by a recessed wheel 62 axially aligned with and suitably connected thereto as shown in FIGS. 1 and 3. Appropriate control buttons 64 on the top wall 66 allow regulation of the printer operation while receptacles 68, also in the top wall 66, may be supplied to provide modem means such as an acoustic coupler so as to utilize the computer in tele-communications.

Figure 2:
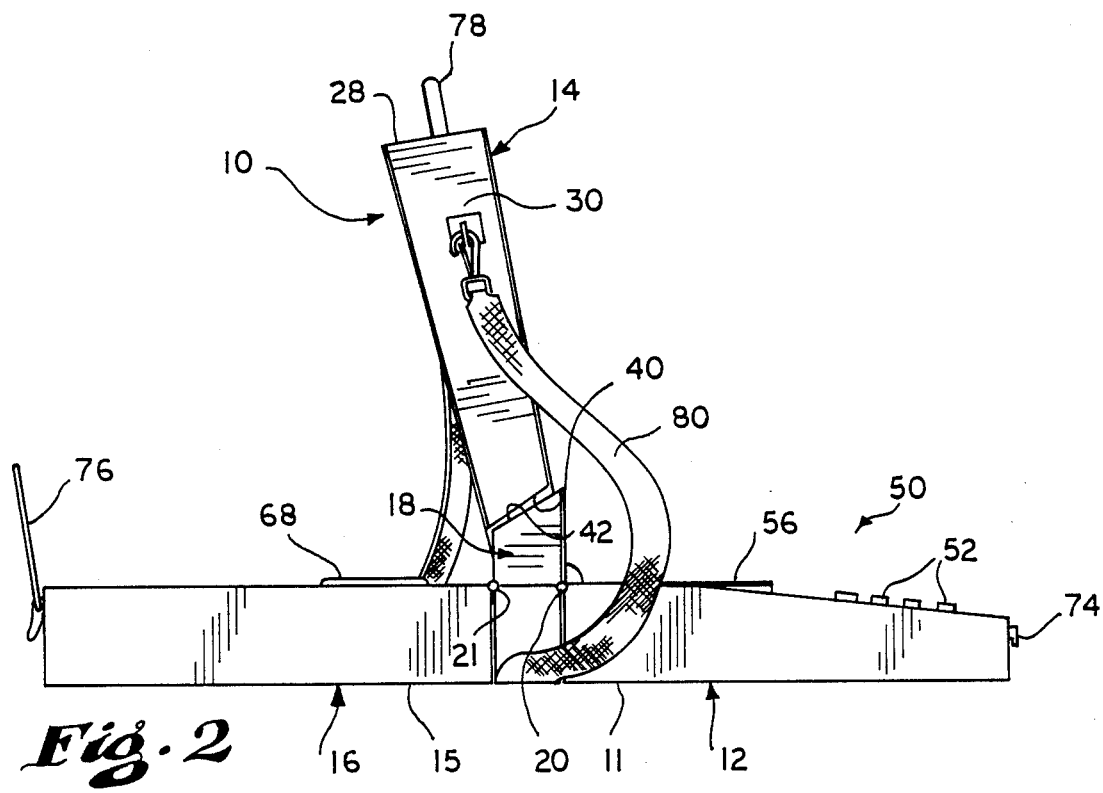
FIG. 2 is a side elevation of the apparatus of FIG. 1, showing the coplanar relationship of the keyboard and output member and the inclination of the center-mounted display member which is vertically oriented as the device is opened and made ready for use.

As will be seen in FIGS. 2 and 4, the output component top wall 66 is co-planar with the bottom wall 15 such that the printer defines a regular cubic configuration, unlike that of the two cooperating components. With this construction, the assembly 10 is readily transformed from the use position of FIGS. 1-3 to the storage or transport position of FIG. 4, by folding both the keyboard unit 12 and output unit 16 approximately 90 degrees relative the intermediate mount element 18 and screen 24, to the closed position of FIG. 4. In this latter condition, it will be observed that the display component 14 is sandwiched between the other two components and the resultant assembly defines a regular cubic mass with flush surfaces about its periphery and wherein all opposite walls or surfaces are parallel.

It will be apparent that with the above described configuration, the combined height of the keyboard unit front wall 44 and display unit top frame 28 will equal the combined height of the mount element bottom wall 19 and keyboard unit rear wall 48. The construction of the display unit with the angled disposition of the planar screen 24 permits the above closure of the components without contact between the keys 52 and screen as the screen will be juxtaposed the planar, horizontal rear top surface 56 and extend in a spaced apart manner over the keys 52, in view of the sloping, front top surface 54 and the display recess 31.

Quite obviously the interior of the keyboard unit 12 is the most likely location for the CPU and other required hardware needed to support operation of the computer 10. This will include any desired number of disk drives 70 and which may be provided with a displaceable protective cover (not shown). Electrical communication between the three components may be by means of suitable well known flexible cables protected beneath pivotable or slidable shroud members 72 at the juncture of the mount element 18 and two adjacent components.

Pairs of suitable cooperating latch members 74,76 respectively attached to the keyboard front wall 44 and output unit 16 provide positive securing of the assembly in the closed position while an intermediate handle 78 on the medial portion of the display unit top frame 28 allows convenient carrying of the collapsed assembly by one hand of the user. Alternative carrying means in the form of a strap 80 affixed to the two side frames 30—30 of the intermediate layer enables one to carry the assembly from their shoulder.

It will be apparent that the objects and advantages of the invention have been met. Further, as many small changes will occur to those skilled in the art, and as it is not desired to limit the invention to the exact construction as disclosed herein, the foregoing should be considered by way of example, illustrating the principles of the invention, with all equivalents thereof falling within the scope of the invention.

What is claimed is:

1. A three layered laptop computer assembly, comprising:
   a keyboard component and an output component,
   a mount element disposed intermediate said keyboard and output components, hinge means respectively joining said mount element to said keyboard and output components, and
   a display component attached to said mount element, whereby
   displacement of said keyboard and output components substantially 90 degrees about said hinge means alters said assembly between an open use position with said keyboard and output components substantially co-planar and said display component supported vertically, to a closed position with said display component sandwiched between said keyboard and output components with all three components defining a regular cubic configuration.

2. A three layered laptop computer assembly according to claim 1 wherein,
   said output component comprises a printer.

3. A three layered laptop computer assembly according to claim 1 wherein, said mount element is provided with an uppermost central cut-out, said display component including a flat screen bounded by a border having a lowermost central tongue pivotally mounted within said mount element cut-out to allow tilting of said screen relative said mount element, and a top and a pair of side frames surrounding said screen border with said screen at least partially recessed therein and inclined relative thereto.

4. A three layered laptop computer assembly according to claim 1 including, latch means on said keyboard and output components adapted to span said display component to retain all said components in said closed position, and carrying means on said display component.

5. A three layered laptop computer assembly according to claim 4 wherein, said carrying means includes a handle.

6. A three layered laptop computer assembly according to claim 4 wherein, said carrying means includes a shoulder strap.

7. A three layered laptop computer assembly according to claim 2 including, modem means on said output component.

8. A three layered laptop computer assembly according to claim 1 including, disk drive means on said keyboard component.

9. A three layered laptop computer assembly according to claim 7 wherein, said modem means includes an acoustic coupler.

10. A three layered laptop computer assembly according to claim 1 wherein, said keyboard component includes a vertical rear wall, a horizontal rear top surface on said keyboard component extending forwardly from said rear wall and joined to a forwardly extending downwardly inclined front top surface on said keyboard component, a vertical front wall joined to said front top surface and of a height less than that of said vertical rear wall, a key area provided with a plurality of keys recessed within said front top surface, a bottom wall on said mount element and of a width less than the height of said vertical rear wall, said display component having a top frame of a width greater than that of said mount element bottom wall whereby, the combined dimensions of said vertical rear wall and bottom wall are substantially equal to that of said front wall and top frame.

11. A closeable three layered laptop computer assembly comprising, first, second and third substantially rectangular components each provided with a distinct computer device, means pivotally joining said first, second and third components into an assembly displaceable from a closed position with all said components in a stacked condition having said second component sandwiched between said first and third component and defining a regular cubic configuration, to an open use position with said components displaced substantially 90 degrees relative one another about said pivot means.

12. A laptop computer according to claim 11 wherein, said components include a keyboard, display and output device.

* * * * *